(12) United States Patent
Schilling et al.

(10) Patent No.: US 7,265,904 B2
(45) Date of Patent: Sep. 4, 2007

(54) OPTICAL SECURITY ELEMENT

(75) Inventors: Andreas Schilling, Hagendorn (CH); Wayne Robert Tompkin, Baden (CH); René Staub, Hagendorn (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/562,331

(22) PCT Filed: Jun. 16, 2004

(86) PCT No.: PCT/EP2004/006467

§ 371 (c)(1),
(2), (4) Date: Dec. 23, 2005

(87) PCT Pub. No.: WO2004/113954

PCT Pub. Date: Dec. 29, 2004

(65) Prior Publication Data

US 2006/0209412 A1    Sep. 21, 2006

(30) Foreign Application Priority Data

Jun. 25, 2003  (DE) ............................... 103 28 760

(51) Int. Cl.
    *G02B 5/18* (2006.01)
(52) U.S. Cl. ........................... 359/569; 359/568; 359/2
(58) Field of Classification Search .................... 359/2, 359/567, 568; 283/86; 356/71
    See application file for complete search history.

(56) References Cited

U.S. PATENT DOCUMENTS

| 5,379,131 | A | 1/1995 | Yamazaki |
| 5,760,961 | A | 6/1998 | Tompkin et al. |
| 5,999,280 | A | 12/1999 | Huang |
| 6,351,537 | B1 | 2/2002 | Dovgodko et al. |
| 6,903,850 | B2 * | 6/2005 | Kay et al. ...................... 359/2 |
| 2005/0243391 | A1 * | 11/2005 | Drinkwater .................. 359/31 |

FOREIGN PATENT DOCUMENTS

| DE | 100 44 465 A | 3/2002 |
| EP | 0520363 A | 12/1992 |
| JP | 2004212927 A * | 7/2004 |
| WO | WO 03/009225 A2 | 1/2003 |
| WO | WO 03009225 A | 1/2003 |

* cited by examiner

Primary Examiner—Fayez G. Assaf
(74) Attorney, Agent, or Firm—Hoffmann & Baron, LLP

(57) ABSTRACT

The invention concerns an optical security element having a substrate layer, in which a first microstructure for producing a first optically perceptible effect is shaped region-wise in a surface region. The surface region is divided into microscopically fine pattern regions and a background region. The first microstructure is shaped in the pattern regions but not in the background region. The microscopically fine pattern regions in the surface region are arranged in the form of a moire pattern into which a concealed item of information which can be evaluated by means of an associated verification element is encoded as a security feature. The microscopically fine pattern regions are further substructured in accordance with a substructuring function which describes a microscopic substructuring, serving as a further security feature, of the moire pattern.

21 Claims, 7 Drawing Sheets

OPTICAL SECURITY ELEMENT

CROSS-REFERENCE TO RELATED APPLICATIONS

This application is a National Phase application of International Application No. PCT/EP2004/006467 filed Jun. 16, 2004, which claims priority based on German Patent Application No. 103 28 760.4, filed Jun. 25, 2003, which are both incorporated herein by reference.

BACKGROUND OF THE INVENTION

The invention concerns an optical security element having a substrate layer, in which a first microstructure for producing a first optically perceptible effect is shaped region-wise into the substrate layer in a surface region of the substrate layer.

U.S. Pat. No. 6,351,537 B1 describes the use of a security element which implements a hologram and a concealed image on a common carrier substrate. The hologram is a hologram which is visible in daylight and which is generated by an optical-diffraction structure shaped into a photopolymer film and is visible without the use of a monochromatic, coherent light source (laser). The concealed image is preferably arranged on the substrate in the proximity of the hologram. The concealed image is rendered visible by means of a decoding device. Digital copiers or scanners are used as the decoding device. That publication also describes using a decoding device in the form of a transparent carrier on which a line grating is printed, with a line spacing corresponding to the desired scanning frequency.

The concealed image is produced from a starting image by a procedure whereby firstly the frequency components of the starting image which are greater than half the scanning frequency of the decoding device are removed and the remaining frequency components are then mirrored at the frequency axis which corresponds to half the scanning frequency.

In that way the substrate provides a first security feature, namely the hologram, and a second security feature, namely the concealed image, whereby the number of security features and thus the level of safeguard against forgery is increased.

U.S. Pat. No. 5,999,380 describes a holographic process for enhancing the level of safeguard against forgery, wherein a concealed image is shaped in a hologram, which image can be perceived only by means of a special evaluation device. It is only when the evaluation device is moved over the hologram that then the concealed image can be visually detected by the human observer.

In that respect, a hologram of that kind with a concealed image is produced in an encoding process which is based on the one hand on a background image and on the other hand the image to be concealed in the hologram. The background image comprises a larger number of parallel black stripes. Now, in the encoding process, those parts of the pattern to be concealed, which are over the black stripes of the background image, are converted into white and those parts of the image to be concealed, which lie over the white part of the background image, are left black. In order to make the pattern which is concealed in the image formed in that way still less perceptible for the naked eye of a viewer, the resulting image is further superimposed with an optical noise pattern.

SUMMARY OF THE INVENTION

The object of the invention is now that of further improving the safeguard against forgery of optical security elements.

That object is attained by an optical security element in which a first microstructure for producing a first optically perceptible effect is shaped region-wise into the substrate layer in a surface region of a substrate layer, in which the surface region is divided into microscopically fine pattern regions and a background region and the first microstructure is shaped in the pattern regions but not in the background region, in which the microscopically fine pattern regions in the surface region are arranged in the form of a moiré pattern into which a concealed item of information which can be evaluated by means of an associated verification element is encoded as a security feature, and in which microscopically fine pattern regions are further substructured in accordance with a substructuring function which describes a microscopic substructuring, serving as a further security feature, of the moiré pattern.

In that respect a moiré pattern is a pattern which is formed from repeating structures and which upon superimposition with or viewing through a further pattern formed by repeating structures exhibits a new pattern which is concealed in the moiré pattern.

The superimposition of a moiré pattern with a decoding device provides that the pattern concealed in the moiré pattern becomes visible due to the moiré effect. The classic moiré effect arises out of the interaction between mutually superposed dark and light structures. It results from the geometrical distribution of dark and light regions in the mutually superposed regions, wherein regions in which dark elements occur one upon the other appear lighter than regions in which the dark elements of the mutually superposed regions are in mutually juxtaposed relationship.

The invention provides a security element which can be imitated only with very great difficulty by the interengagement of various security features. The substructuring of microscopic fine pattern regions of a microstructure, which are arranged in the form of a moiré pattern, provides that additional items of information are encoded in the surface region, which cannot be perceived either by the naked eye or by the verification element associated with the moiré pattern. The specific configuration of the structure can however be perceived with a magnifying glass or a microscope and serve as an additional security feature or for identification purposes. As the substructuring also has an effect on the average surface coverage within the pattern regions of the moiré pattern, implementing changes in the substructuring also has an action on the optical effects which become visible when checking the surface region by means of a verification element associated with the moiré pattern. Thus for example alterations of that kind become perceptible by virtue of the occurrence of non-homogeneous regions (viewing with/without verification element) or due to a variation in the optical effects which occur upon displacement or rotation of the verification element. The optical effects produced by the substructuring, the arrangement of the pattern regions and the microstructure thus engage into each other and are in superposed relationship, whereby imitation is made more difficult and forgeries are easy to perceive.

In addition the optical effects generated by a security element according to the invention cannot be imitated by means of a moiré image contained in a hologram. Imitation by means of conventional holographic techniques, as is possible for example in the mere implementation of a concealed image in a hologram, is accordingly not possible. That further enhances the level of safeguard against forgery.

Advantageous developments of the invention are characterised in the appendant claims.

It is desirable to use a diffraction grating, a diffraction structure for producing a first hologram or a matt structure as the first microstructure. It has proven to be advantageous for a reflecting surface, a transparent surface (micro-metallisation), a second diffraction grating which differs from the first diffraction grating, a diffraction structure for producing a second hologram or a second matt structure which is different from the first matt structure, to be shaped in the background region.

The first and second diffraction gratings can in that case differ for example in respect of azimuth angle, grating frequency or profile shape.

The term matt structures is used to denote structures having scattering properties. Those scattering properties can be produced by a microstructure with a stochastic surface profile or by a diffraction structure which has such properties. Diffraction structures of that kind can also be produced holographically. The first and second matt structures can involve isotropic or anisotropic matt structures. Isotropic matt structures have a symmetrical scatter cone whereas anisotropic matt structures exhibit an asymmetrical scatter behaviour and have for example a preferred scatter direction. In that respect the first and the second matt structures differ for example in the spread angle of the scatter cone and/or in the preferred scatter direction.

It will be appreciated that it is also possible for the background region to have different microstructures.

The fact that a microstructure which is different from the microstructure of the pattern region is shaped in the background region means that further optical superimposition effects occur, whereby the level of safeguard against forgery of the optical security element is further improved.

In addition it is also possible to use micro-metallisation as a further variant for substructuring. The contrast is achieved by the difference between the reflecting layer and the transparent region. In that case the pattern region can also be in the form of a mirror. In addition the micro-metallisation can be combined with a semitransparent HRI layer in the background region. In addition the same optical-diffraction structure can be present both in the pattern region and also in the background region, in which case the contrast is achieved by the different reflection capability.

It is advantageous for the moiré pattern to comprise a line grating comprising a plurality of lines with a line spacing in the range of 40 to 200 µm. That line grating is phase-displaced in region-wise manner to produce the concealed information. In that case the phase displacement is preferably half a line grating period. Besides a linear line grating it is also possible for the lines of the line grating to have curved regions and for example to be arranged in a wave-shaped or circular configuration. Then, for decoding the concealed information, a corresponding verification element is required, which also has a line grating which is of such a shape. In that way it is possible for the decoding of the concealed information to be effected only by means of a quite specific, individual verification element, which further enhances the level of safeguard against forgery of the optical security element. There is also the possibility of the moire pattern being made up of two line gratings which are rotated relative to each other through 90 degrees. That affords the advantageous effect that not just one but two different concealed items of information can be encoded in the moiré pattern. Those items of information can be evaluated in succession by rotation of the verification element. That also enhances the level of safeguard against forgery of the optical security element.

The average surface coverage of the moiré pattern in relation to the resolution capacity of the human eye and the average surface coverage of the substructuring described by the substructuring function in relation to the resolution capacity of the human eye is preferably constant. In that way it is not possible for the human observer to recognise the presence of further security features without auxiliary means.

Advantageous effects can be achieved if the average surface coverage of the moiré pattern in relation to the resolution capacity of the human eye is constant, but the surface coverage of the pattern regions is varied by partially different substructuring. In that way it is possible to generate patterns which are optically perceptible to the human eye, in the surface region, by the substructuring, and that further enhances the safeguard against forgery.

The substructuring function preferably describes a continuous substructuring pattern. It is however also possible that the substructuring function describes a non-continuous substructuring pattern.

It is desirable for the substructuring function to describe a substructuring pattern which is made up of a plurality of similar individual elements. Further advantages can be achieved by virtue of the fact that the spacings of the individual elements or the orientation thereof are varied for encoding further items of information in the substructuring. Those additional items of information can be used as a further security feature or for data storage. It is particularly advantageous if—as already stated above—in that case the average surface coverage, which can be resolved by the human eye, of the substructuring pattern remains constant.

Further preferred possible ways of introducing additional items of information and security features by the substructuring provide that the substructuring function describes a microtext or nanotext or superimposes a two-dimensional grating. Preferred letter heights in the microtext or nanotext in that case are in the range of 50 to 80 µm. Instead of a microtext or nanotext or in combination with such a text the substructuring function can also describe nano-images which for example are formed from pixels of a size of 1 µm×1 µm. Such a nano-image can also involve a corporate logo. Preferably nano-images of that kind are in a range of sizes of 20 µm to 100 µm.

Further advantageous effects can be achieved by the pattern regions being substructured with an asymmetrical surface profile. By virtue thereof the substructuring has an effect in particular on the optical effects which are visible to the viewer upon displacement of the verification element. It is particularly advantageous here for only the centroids of the pattern regions to be displaced in phase relative to each other in region-wise manner to produce the items of concealed information, that is to say for the centroids and not the outlines of the pattern regions to be arranged in accordance with the moiré pattern. The pure line grating is resolved in that way so that even upon correct orientation of the verification element, there exist positions of the verification element, in which partial regions of non-phase-displaced and phase-displaced pattern regions are superimposed in respect of their optical effect.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
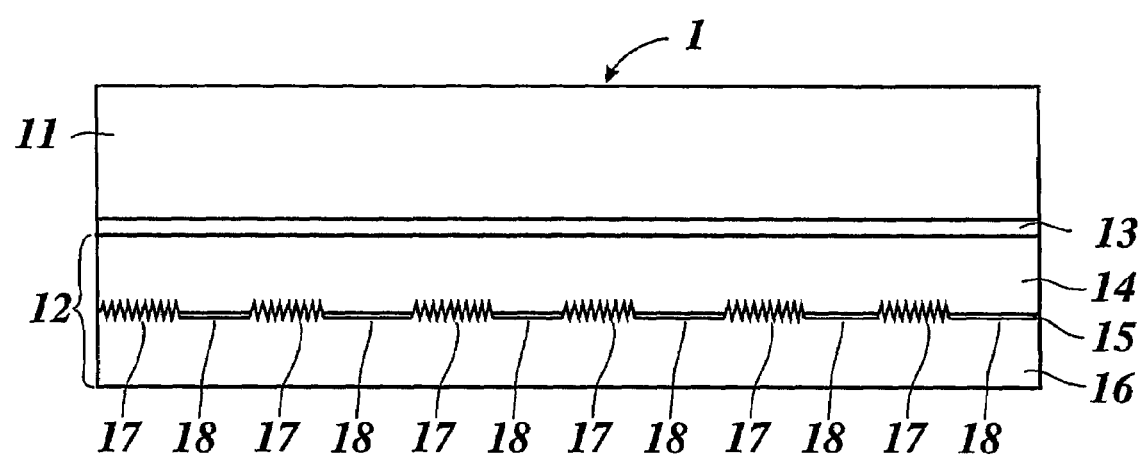
FIG. 1 shows a view in section of an optical security element according to the invention.

FIG. 1 shows a stamping film 1 which comprises a carrier film 11 and a transfer layer portion 12 serving as an optical security element. The transfer layer portion 12 has a release and/or protective lacquer layer 13, a replication layer 14, a reflection layer 15 and an adhesive layer 16.

The carrier layer 21 comprises for example a polyester film of a thickness of 12 µm to 50 µm. The release and/or protective lacquer layer 13 is applied to that carrier film, in a thickness of 0.3 to 1.2 µm. The replication layer 14 is now applied to the release and/or protective lacquer layer. The replication layer 14 is preferably a transparent thermoplastic material which is applied for example by means of a printing process over the full area to the film body formed by the carrier film 11 and the protective lacquer and/or release layer 14. The application operation can be effected for example with a line grating intaglio printing cylinder with an application weight of 2.2 g/mm after drying, the drying operation being effected in a drying passage at a temperature of 100 to 120° C. A microscopic surface structure is now replicated into the replication layer by means of a stamping tool in regions 17. For example in that way the microscopic surface structure is embossed at approximately 130° C. with a die comprising nickel.

It is however possible for the replication operation to be carried out by means of a UV replication process, wherein a UV replication lacquer is applied to the film body formed by the carrier film 11 and the release and/or protective lacquer layer 13 and then partially irradiated with UV light for replication of the microstructure.

After replication of the microstructure in the replication layer 14 the replication lacquer hardens by cross-linking or in some other fashion.

It is also possible for the microstructure to be shaped in the layer 14 by means of holographic methods. For that purpose, in the holographic exposure operation, the background region is covered with a suitable mask or the microstructure is removed in the background region after the exposure operation.

A thin reflection layer 15 is now applied to the replication layer 14. The reflection layer 15 preferably involves a thin, vapour-deposited metal layer or an HRI layer (HRI='High Reflection Index'). For example $TiO_2$, ZnS or $Nb_2O_5$ can be used as materials for an HRI layer. The material for the metal layer can essentially be chromium, aluminium, copper, iron, nickel, silver, gold or an alloy of those materials. In addition instead of such a metallic or dielectric reflection layer, it is possible to use a thin film layer sequence with a plurality of dielectric or dielectric and metallic layers.

The adhesive layer 16 is now applied to the film body formed in that way, the adhesive layer comprising for example a thermally activatable adhesive.

For applying the optical security element to a security document or some other article to be safeguarded, the stamping film 1 is applied with the transfer layer portion 12 leading to the security document or the article to be safeguarded and is then pressed under the effect of heat against the security document or the article to be safeguarded. In that operation the transfer layer portion is joined by way of the adhesive layer 16 to the corresponding surface of the security document or the article to be safeguarded. In addition, as a consequence of the development of heat, the transfer layer portion 12 is detached from the carrier film 11 which is now pulled off the transfer layer portion 12 and removed. An optical security element according to the invention which comprises the transfer layer portion 12 or parts of the transfer layer portion 12 is now applied to the security document or the article to be safeguarded.

It will be appreciated that it is also possible for an optical security element according to the invention to be part of a transfer or laminating film or to be formed by a stamping film, a sticker film, a transfer film or a laminating film. In addition it is also possible for an optical security element according to the invention to have further layers besides the layers 13, 14, 15 and 26 shown in FIG. 1. Such further layers can be for example (coloured) decorative layers or layers of a thin film layer system which produces colour shifts in dependence on the angle of view, by means of interference.

In addition it is also possible for the reflection layer 15 to be only partially implemented or to be entirely dispensed with, so that the optical security element acts as a transparent and not as a reflective security element. It would also be possible to dispense with the adhesive layer 16.

Figure 2:
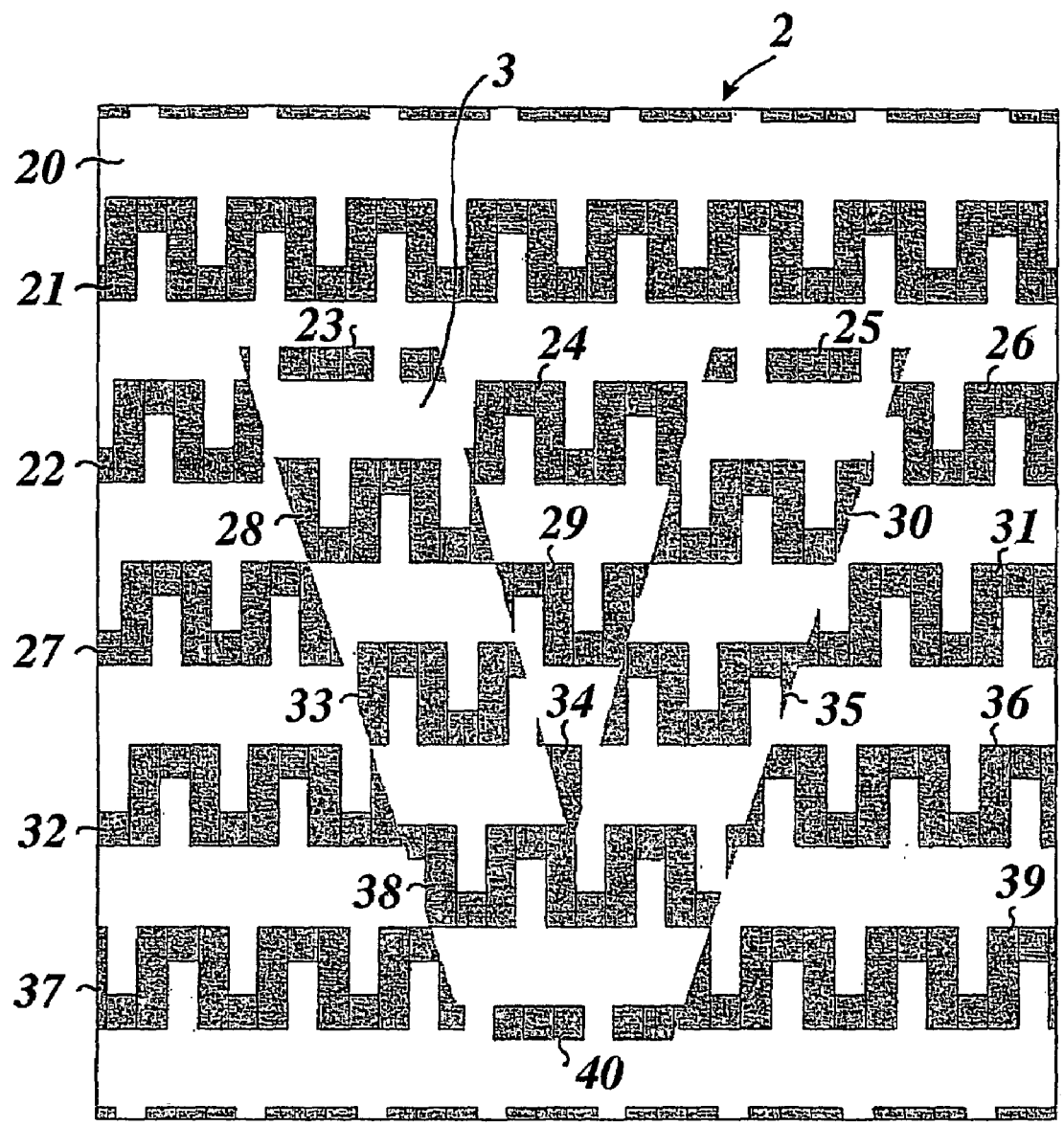
FIG. 2 shows a diagrammatic view of a surface region of the optical security element of FIG. 1, FIGS. 3a to 3d show diagrammatic views of possible substructuring patterns for an optical security element according to the invention.

As already explained above, the microstructure is only replicated in region-wise manner in the replication layer 14 so that in the replication layer 14 there are regions 17 in which the microstructure is replicated and regions 18 in which the microstructure is not replicated into the surface of the replication layer 14. FIG. 2 now shows a surface region of the optical security element formed by the transfer layer portion 12, clearly showing the regions in which replication of the microstructure in the surface of the replication layer 14 is effected.

FIG. 2 shows a surface region 2 which is divided into a background region 20 and a plurality of pattern regions 21 to 40. As shown in FIG. 2 the pattern regions 21 to 39 are each substructured in accordance with a respective substructuring function, wherein the substructuring function describes a substructuring of the respective pattern region in the form of a meander-shaped pattern. The pattern regions 22, 24 and 26 are spaced from the pattern region 21 preferably at 40 to 300 µm. Such a spacing provides that on the one hand the optical effects produced by the microstructures disposed in the pattern regions 21, 22, 24 and 26 mingle in the human eye and are not individually resolved, and on the other hand sufficiently large individual surfaces are available for the respective shaped microstructure. The pattern regions 22, 24, 26, 27, 29, 31, 32, 34, 36, 37 and 39 are then also correspondingly spaced from each other.

As shown in FIG. 2 in a V-shaped partial region 3 of the surface region 2, the pattern regions 23, 28, 35, 38, 40, 35, 30 and 24 are arranged in phase-displaced relationship with respect to the pattern regions 21, 22, 26, 27, 29, 31, 32, 34, 36, 37 and 39 surrounding them.

Accordingly the pattern regions 21 to 40 form a line grating which is substructured by means of the above-described substructuring function, with a plurality of uniformly spaced substructured lines, with the line grating being phase-displaced in the partial region 3 to produce the concealed information.

A first microstructure is now shaped in the pattern regions 21 to 40. That microstructure preferably involves a diffraction structure of a 3D or 2D/3D hologram.

It is further possible for the microstructure to be formed by a diffraction grating with a spatial frequency of more than 300 lines/mm. Preferred spatial frequencies of such a diffraction grating are in the range of 600 to 1800 lines/mm. In addition it can also be advantageous to use a diffraction grating with a very high spatial frequency which is less than the wavelength of the light. It is also possible to use zero-order diffraction gratings or asymmetrical diffraction gratings. In that case the grating parameters of the diffraction grating can be constant in the pattern regions 21 to 40, but they can also be varied in order thus for example to produce a kinegram® effect or other optical effects which generate an optical impression which is dependent on the viewing angle.

It is further possible for the microstructure to be a matt structure which is shaped in the pattern regions 21 to 40.

It is also possible to provide transparent regions by means of partial metallisation in the pattern regions 21 to 40 whereas a diffractive structure is provided in the background region 20.

No microstructure is shaped into the replication layer 14 in the background region 20 which is composed of the partial surfaces of the surface region 2, which are not covered by the pattern regions 21 to 40, so that a planar reflecting surface is afforded there, from which the microstructure shaped in the pattern regions 21 to 40 stands out.

It is however also possible for a transmissive element, a diffraction grating, a hologram-producing diffraction structure or a matt structure to be shaped in the background region 20 instead of a planar reflecting element.

If the diffraction structure of a hologram is shaped in the pattern regions 21 to 39, then preferably a matt structure, a diffraction grating or a diffraction structure of another hologram which differs in the viewing direction and/or in respect of colour impression from the first hologram is shaped in the background region 20. If a matt structure is shaped in the pattern regions 21 to 40, preferably a second matt structure with a different scattering characteristic is shaped in the background region 20. If a diffraction grating is shaped in the pattern regions 21 to 40, preferably a matt structure or a diffraction grating which differs from that diffraction grating in the grating parameters, for example in the number of lines or orientation, is shaped in the background region 20.

For verification of the information encoded in the surface region 2 (letter 'V'), a verification element is used, comprising a line grating or a printed line grating with a line spacing corresponding to that of the pattern regions 21 to 40. If the verification element is oriented on the surface region 2 in such a way that it covers the pattern regions 21, 22, 24, 26, 27, 29, 31, 32, 34, 36, 37 and 39, then the optical effect produced by the pattern regions 21 to 40 is only still produced in the partial region 3. Accordingly in that partial region 3 the viewer perceives an optical effect which arises out of the superimposition of the optical effect produced in the background region 20 and the optical effect produced in the pattern regions. In contrast, in the partial region of the surface region 2, which surrounds the partial region 3, the viewer only still perceives the optical effect produced in the background region 20. If the verification element is oriented in such a way that it covers the pattern regions 23, 25, 28, 30, 33, 35, 38 and 40, the situation is reversed. If no verification element is applied to the surface region 2, the human viewer, in the surface region, has an optical impression which arises out of the superimposition of the optical effect produced in the pattern regions and the optical effect produced in the background region. If for example diffraction structures of two holograms which differ in viewing direction and/or colour impression are shaped in the pattern regions and in the background region, then, when viewing without a verification element, both holograms can be seen by the viewer, while, when using a verification element, the one hologram is only visible in the partial region 3 and the other hologram is only visible in the partial region of the surface region 2, which surrounds the partial region 3.

As the average surface coverage of the meander-shaped substructuring described by the substructuring function, in relation to the resolution capacity of the human eye, is constant, that does not influence the viewing impression which occurs in the above-described situations. It can however be discerned with a magnifying glass or a microscope and can serve as an additional security feature or for identification purposes. As already described above, additional optically perceptible effects which can serve as a further security feature occur due to the structuring upon displacement of the verification element, in the surface region 2.

A phase displacement of 180 degrees between the pattern regions of the partial region 3 and the pattern regions surrounding same permits a particularly high contrast when viewing through the verification element as then the entire surface region of the pattern regions of the partial region 3 can be covered whereas the pattern regions surrounding same are not covered. It will be appreciated that in that respect it is also possible to deviate somewhat from the phase displacement of 180 degrees. In addition advantages can also be enjoyed by considerably deviating from a phase displacement of 180 degrees in one partial region or the other and for example providing a phase displacement of 45 degrees or 135 degrees. Thus it is possible for example to implement concealed grey scale images in which the grey scale is encoded by means of the phase displacement.

Instead of using a linear line grating for the arrangement of the pattern regions 21 to 40 it is possible to use a complex, for example wave-shaped line grating, in which case also phase displacement of the pattern regions is implemented in partial regions of the line grating in order to encode concealed items of information in the line grating. A verification element which covers surface regions in accordance with that line grating is used for evaluation purposes.

Further possible options in regard to substructuring of pattern regions will now be described with reference to FIGS. 3a to FIG. 4.

FIG. 3a shows a plurality of pattern regions 41 which are substructured in accordance with a substructuring function describing a meander-shaped substructuring. In this case the substructuring function does not need to describe a continuous substructuring pattern. Thus FIG. 3b shows substructured pattern regions 42 which are substructured in accordance with a substructuring pattern made up of a plurality of similar elements 43.

The spacings of the individual elements or the orientation of the individual elements can be varied in that case as long as the average surface coverage of the substructuring pattern, which can be resolved by the human eye, remains constant.

Thus FIG. 3c shows the substructuring of two adjacent pattern regions 44 and 45 in which the spacings of the individual elements 43 are varied. As shown in FIG. 3c in that case the average surface coverage of the substructuring pattern remains constant. By virtue of such an arrangement of spacings, it is possible for additional, for example electronically evaluatable items of information to be encoded in the optical security element.

FIG. 3d now shows the possibility of encoding items of information into the substructuring not only by virtue of differing spacing but also by virtue of differing orientation of individual elements, and in that case keeping constant the average surface coverage of the substructuring pattern, which can be resolved by the human eye.

Thus FIG. 3d shows three adjacent pattern regions 46, 47 and 48 which are each formed by five individual elements which differ in respect of their orientation and their spacing.

Furthermore it is also possible for items of information to be additionally encoded into the substructuring pattern by a differing phase position in respect of adjacent individual elements.

Figure 4:
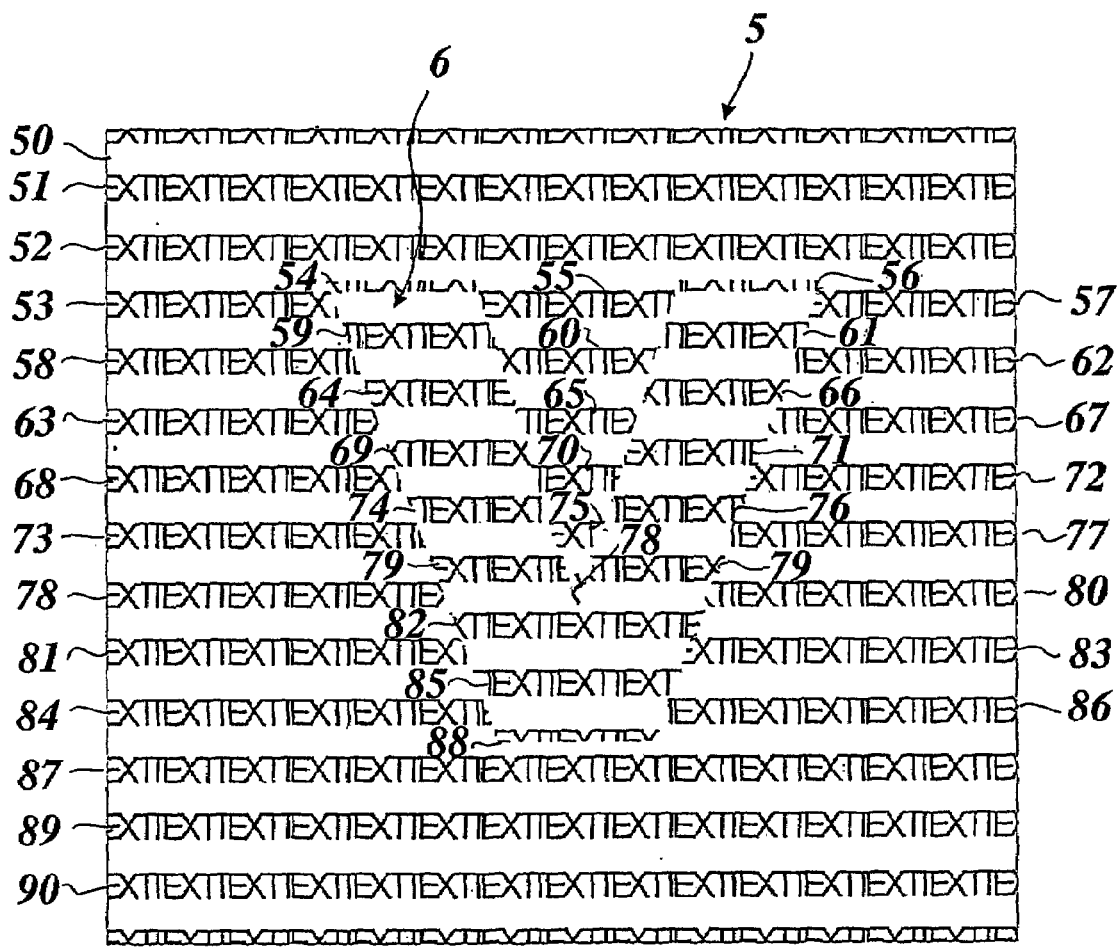
FIG. 4 shows a diagrammatic view of a surface region of an optical security element according to the invention for a further embodiment of the invention.

FIG. 4 now shows a surface region 5 which is divided into a background region 50 and pattern regions 51 to 90. In this case the pattern regions 50 to 90 are substructured in accordance with a substructuring function which writes a microtext or nanotext. The letter height of that microtext or nanotext is 60 µm in the embodiment shown in FIG. 4.

The surface regions in a V-shaped partial region 6 of the surface region 5 are phase-displaced in relation to the pattern regions surrounding them, similarly to the embodiment shown in FIG. 2. The part of the optical security element which forms the background region 50 is of a configuration like the background region 20 shown in FIGS. 1 and 2 and thus for example has a reflecting planar surface, a diffraction grating, a diffraction structure of a hologram or a matt structure. The regions of the optical security element, which are covered by the substructured pattern regions 51 to 90, are of a configuration like the pattern regions 21 to 40 of FIG. 2 and FIG. 1 and for example have a diffraction grating, a diffraction structure of a hologram or a matt structure.

It will be appreciated that, instead of the letter combination 'TEXT' shown in FIG. 4 and used for the substructuring, it is also possible to select a different kind of letter combination which can also reproduce a complex content. Furthermore it is also possible to use nano-images for the substructuring instead of or in combination with letters and letter combinations.

It is further also possible for the substructuring to be composed of a combination of various substructuring options as described hereinbefore, or for the one substructuring or the other to be used for example line-wise alternately.

Figure 5A:
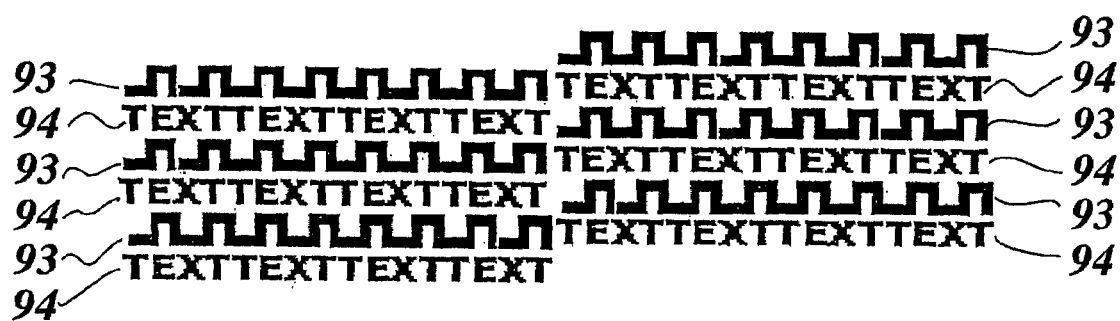
FIGS. 5a and 5b show diagrammatic views of portions of surface regions of optical security elements according to the invention for further embodiments of the invention.

FIG. 5a thus shows for example a substructuring of pattern regions and background region, in which the background region is structured with a substructuring 94 and the pattern regions with a substructuring 93.

In this case, different optical-diffraction structures can be provided in the regions of the substructurings 93 and 94. The linear grating is again displaced by half a period in accordance with the concealed information to be encoded. If a verification element (for example a linear grating comprising transparent and opaque regions involving the same period) is applied, it covers for example the structures in the substructuring 94 on the left-hand side while the verifier correspondingly covers the structures in the substructuring 93 on the right-hand side.

In comparison with the variants described hereinbefore, this involves a background region of the meander configuration, which is additionally substructured in accordance with 'TEXT'.

In addition for example mirrors or a further structure which differs from the two optical-diffraction structures of the line gratings, for example in the meander configuration or text, can be disposed in the background of two line gratings which are substructured in different ways.

Figure 5B:
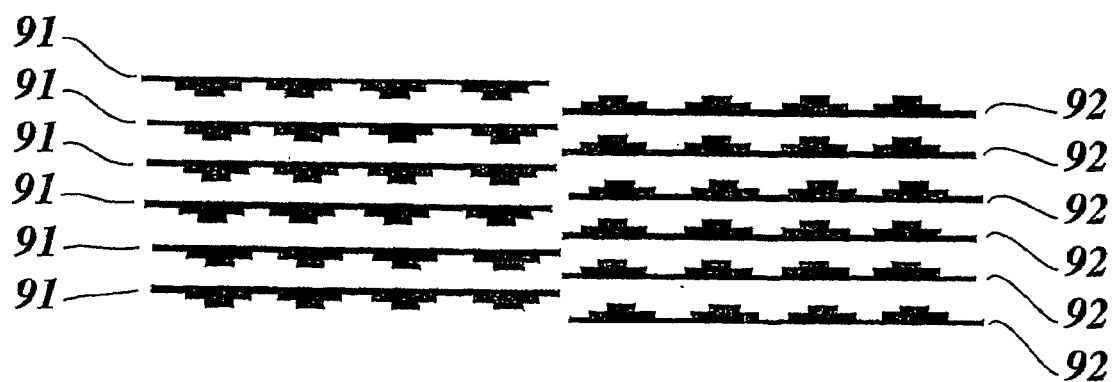

FIG. 5b shows a further possible option of substructuring of pattern regions.

FIG. 5b shows a plurality of substructured pattern regions 91 which are phase-displaced in relation to substructured pattern regions 92. As shown in FIG. 5 the pattern regions 91 and 92 are substructured by means of a respective asymmetrical substructuring pattern so that the centroid of the pattern region is displaced upwardly or downwardly respectively by the substructuring.

That effect can be used to displace in each case only the centroid of the substructured pattern region afforded by the substructuring, by half a period of the verification element, instead of the phase displacement shown in FIG. 2 and FIG. 4, in the respective partial regions 3 and 6. As shown in FIG. 5b in that way the phase displacement by half a period can be replaced by a mirroring.

It will be appreciated that it is also possible, instead of the mirror-symmetrical substructuring patterns shown in FIG. 5b, for the pattern regions 91 and 92, to use any different substructuring patterns which differ in terms of their centroid. It is advantageous in that respect however if the average surface coverage of those substructuring patterns, in relation to the resolution capacity of the human eye, remains constant and is identical so that the concealed information cannot be seen by the naked eye.

Figure 6A:
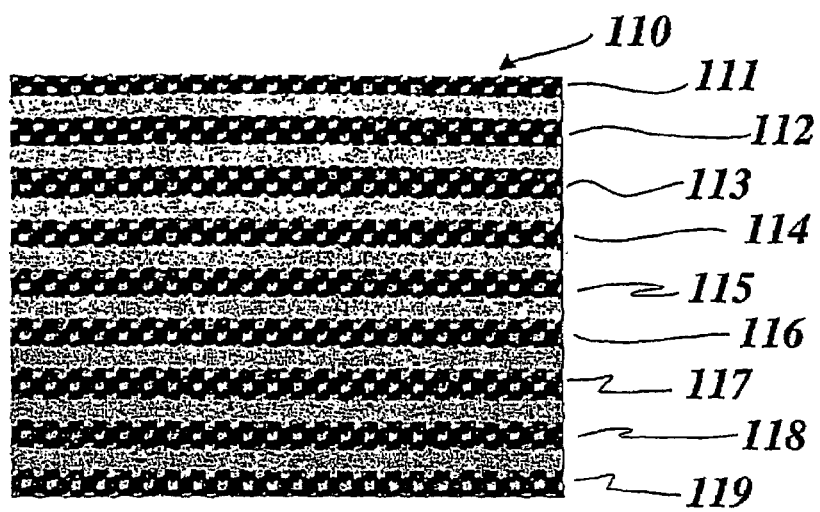
FIGS. 6a to 6c show views of portions of surface regions of optical security elements according to the invention for further embodiments of the invention.
Figure 6B:
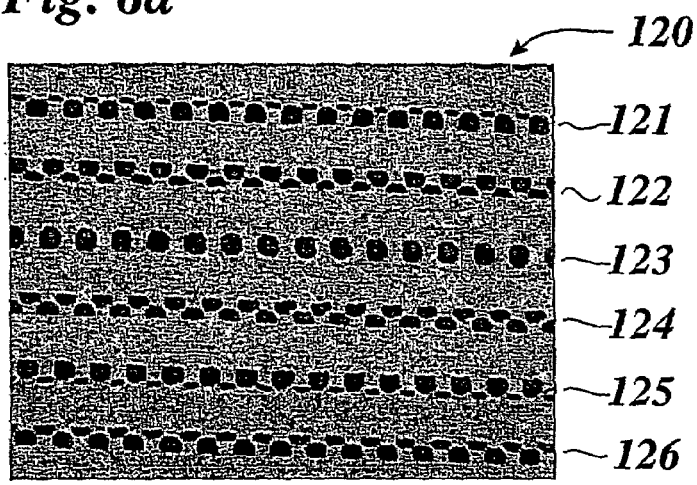
Figure 6C:
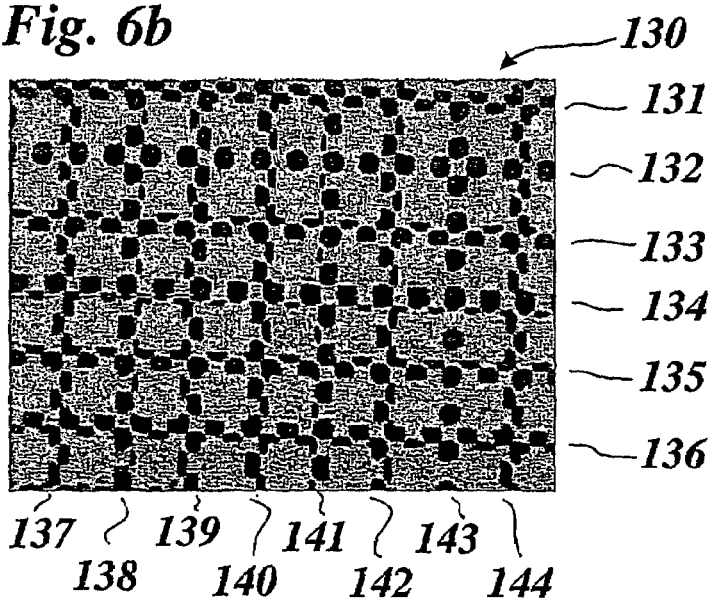

FIGS. 6a to 6c show further possible options of the substructuring of pattern regions by the superimposition of a two-dimensional grating.

Thus FIG. 6a shows a surface region 110 with a plurality of pattern regions 111 to 119 and FIG. 6b shows a surface region 120 with a plurality of pattern regions 121 to 126. As shown therein the substructuring of the pattern regions is afforded in each case by the superimposition of dot and line gratings. It will be seen that respective adjacent pattern regions can have a different pattern which arises out of that superimposition. In section however each pattern region is of the same optical density so that a surface which is correspondingly occupied with optical-diffraction structures appears homogeneous in effect to a viewer as that substructuring cannot be resolved by the eye.

FIG. 6c shows a surface region 130 with pattern regions 131 to 136 and 137 to 144, which are arranged in accordance with a two-dimensional grating. The principle of substructuring by means of a superimposing line and dot grating, which is shown in FIGS. 6a and 6b, is used here to encode two different concealed items of information in the pattern regions, which can be evaluated at two different orientation directions (0 degree and 90 degrees) of the verification element.

Figure 7:
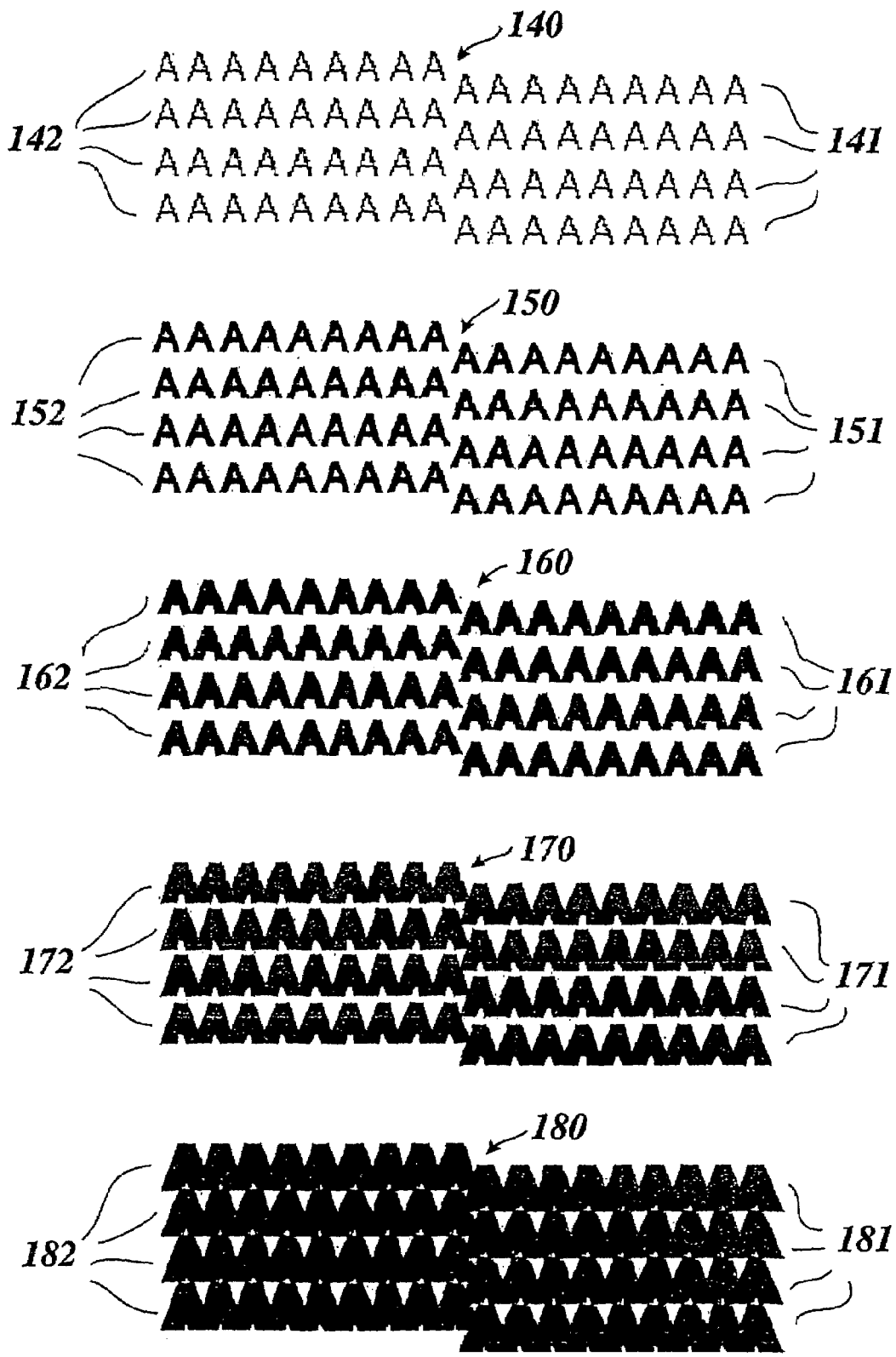
FIG. 7 shows a diagrammatic view of a plurality of partial regions of an optical security element according to the invention for a further embodiment of the invention.

FIG. 7 shows a plurality of partial regions 140, 150, 160, 170 and 180 of a surface region. A plurality of substructured pattern regions 142 and 141 which are phase-displaced relative to each other are arranged in the partial region 140. A respective plurality of substructured pattern regions 152 and 151, 162 and 161, 172 and 171, and 182 and 181 respectively, which are phase-displaced relative to each other, are arranged in each of the pattern regions 150, 160, 170 and 180.

As can be seen from FIG. 7 the substructuring patterns differ in the partial regions 140, 150, 160, 170 and 180 in such a way that their average surface coverage which can be resolved by the human eye is different. Accordingly the average surface coverage of the substructuring pattern is only constant in the respective partial region so that the information encoded by the phase displacement remains invisible to the human viewer without the aid of a verification element.

Such substructuring of the pattern regions, which is in part different, provides that the ratio of the average surface coverage by pattern regions and by the background region is partially varied so that in part either the optical effect produced in the pattern regions is more in the foreground or the optical effect produced in the background region is more in the foreground. In that case the concealed information can be seen by means of the verification element at a very high level of contrast with an average surface ratio of pattern regions to background region. The contrast disappears at 0% or 100% surface coverage by the pattern regions.

Thus such a partial variation in the substructuring function which can also occur 'quasi-continuously' can provide for generating a further security feature which is perceptible for the viewer, for example image information in a grey scale representation.

The invention claimed is:

1. An optical security element having a substrate layer, wherein a first microstructure for producing a first optically perceptible effect is shaped region-wise into the substrate layer in a surface region of the substrate layer, wherein
the first microstructure is a diffraction structure, diffraction structure for producing a hologram or a matt structure, that the surface region is divided into microscopically fine pattern regions and a background region and the first microstructure is shaped in the pattern regions but not in the background region, that the microscopically fine pattern regions in the surface region are arranged in the form of a moire pattern into which a concealed item of information which can be evaluated by means of an associated verification element is encoded as a security feature, wherein the moire pattern has at least one line grating, with a plurality of lines at a line spacing in the range of 40 to 200 μm and the line grating is phase-displaced in region-wise manner to produce the concealed information, and that the microscopically fine pattern regions are further substructured in accordance with a substructuring function which describes a microscopic substructuring, which serves as a further security feature, of the moire pattern and which encodes additional items of information in the surface region.

2. An optical security element according to claim 1, wherein the first microstructure is a first diffraction grating.

3. An optical security element according to claim 1, wherein, the first microstructure is a diffraction structure for producing a first hologram.

4. An optical security element according to claim 1, wherein the first microstructure is a first matt structure.

5. An optical security element according to claim 1, wherein a reflecting surface is arranged in the background region.

6. An optical security element according to claim 1, wherein a second microstructure is shaped in the background region, that microstructure being formed by a second diffraction grating which is different from the first diffraction grating.

7. An optical security element according to claim 1, wherein a second microstructure is shaped in the background region, said second microstructure being formed by a diffraction structure for producing a second hologram.

8. An optical security element according to claim 1, wherein a second microstructure is shaped in the background region, said second microstructure being formed by a second matt structure which is different from the first matt structure.

9. An optical security element according to claim 1, wherein the line grating has regions in which the lines of the line grating are curved.

10. An optical security element according to claim 1, wherein the moire pattern comprises two line gratings which are rotated relative to each other through at least 45 degrees.

11. An optical security element according to claim 1, wherein the moire pattern comprises a two-dimensional grating.

12. An optical security element according to claim 1, wherein the average surface coverage of the moire pattern in relation to the resolution capacity of the human eye is constant.

13. An optical security element according to claim 1, wherein the average surface coverage of the substructuring described by the substructuring function in relation to the resolution capacity of the human eye is constant.

14. An optical security element according to claim 1, wherein the average surface coverage of the moire pattern is varied by partially different substructuring.

15. An optical security element according to claim 1, wherein the substructuring function describes a continuous substructuring pattern.

16. An optical security element according to claim 15, wherein the substructuring function describes a substructuring pattern made up of a plurality of similar individual elements.

17. An optical security element according to claim 16, wherein the spacings of the individual elements and/or their orientation is varied for encoding of a further item of information but the average surface coverage of the substructuring pattern, which can be resolved by the human eye, remains constant.

18. An optical security element according to claim 1, wherein the substructuring function describes a non-continuous substructuring pattern.

19. An optical security element according to claim 1, wherein the substructuring function describes a microtext or nanotext which is preferably of a letter height in the range of 20 to 100 μm.

20. An optical security element according to claim 1, wherein a two-dimensional grating is superimposed on the substructuring function.

21. An optical security element according to claim 1, wherein the pattern regions are substructured with an asymmetrical surface profile and that the centroids of the pattern regions are phase-displaced in region-wise manner to produce the concealed information.

* * * * *